Jan. 8, 1957  J. M. SEPERSKY  2,776,642
AQUARIUM UTILITY HOUSING
Filed April 21, 1954  3 Sheets-Sheet 1

INVENTOR.
JOSEPH M. SEPERSKY
BY
ATTORNEY

Jan. 8, 1957　　　　　　J. M. SEPERSKY　　　　　2,776,642
AQUARIUM UTILITY HOUSING
Filed April 21, 1954　　　　　　　　　　　　　3 Sheets-Sheet 2

INVENTOR.
JOSEPH M. SEPERSKY
BY
ATTORNEY

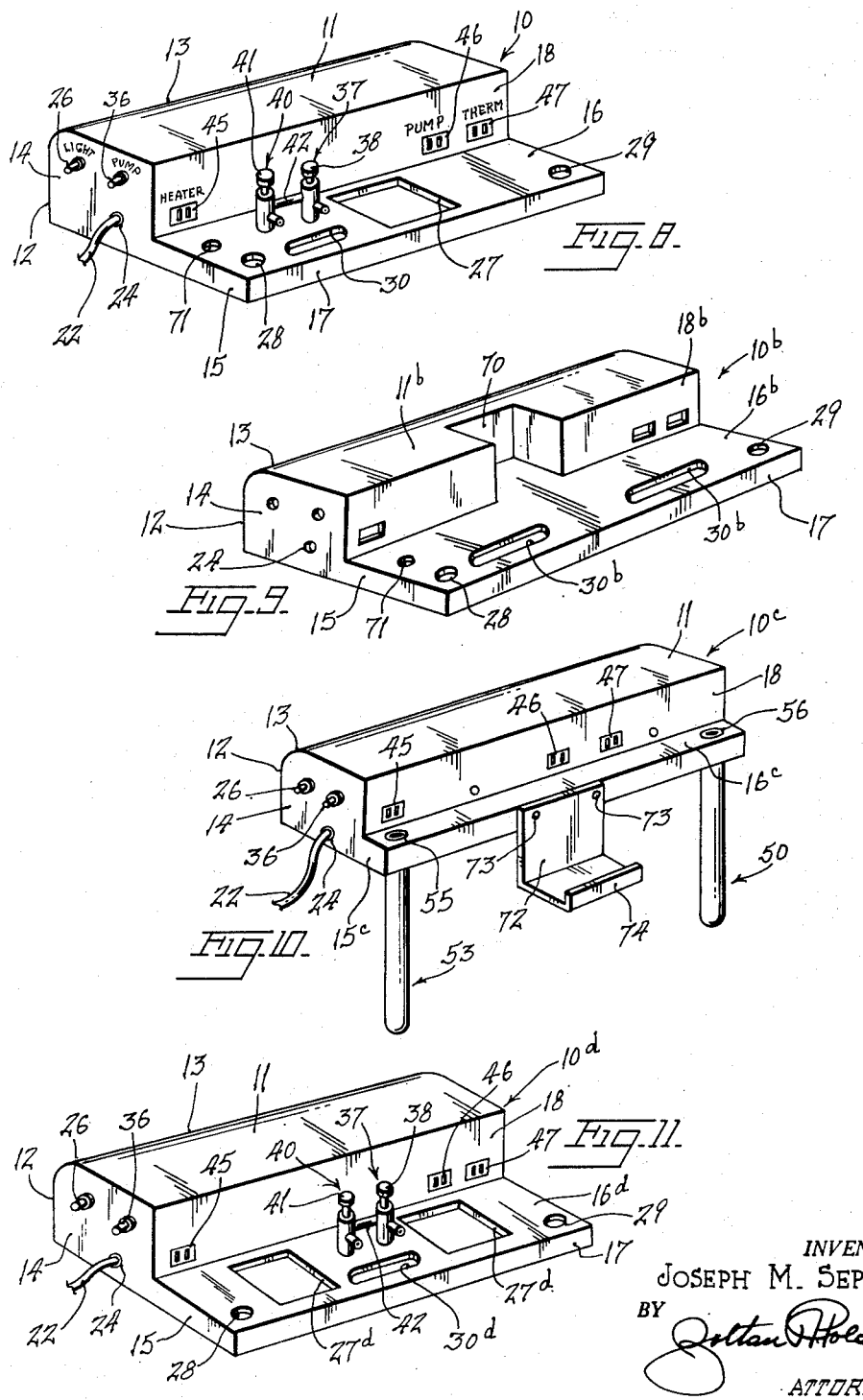

United States Patent Office 2,776,642
Patented Jan. 8, 1957

2,776,642

AQUARIUM UTILITY HOUSING

Joseph M. Sepersky, Brooklyn, N. Y.

Application April 21, 1954, Serial No. 424,594

6 Claims. (Cl. 119—5)

This invention relates to aquariums and, more particularly, to hoods therefor.

It is an object of the present invention to provide a reflector or hood for aquariums in which are provided heating and thermostat means as well as air compression means for the operation of conventional aeration and filtering apparatus which are easily and readily accessible and removable for servicing.

It is another object of the present invention to provide a hood or reflector for aquariums of the above type which is, in effect, a lamp, heater and pump combination, vertical waterproof heating and thermostatic elements being provided at suitable locations, preferably at the corners thereof, to be suspended vertically into the corners of the aquarium, where they will be concealed in the upright supports of said aquarium.

It is a further object of the present invention to combine all of the various utilities required in the proper maintenance of an aquarium and the necessary controls therefor into one compact and convenient unit with a single source of power, said unit being not only more efficient in operation but also more pleasing in appearance, an important consideration since the aquatic life usually maintained in aquariums of the type in question are kept mainly for purposes of display.

It is still another object of the present invention to provide an aquarium hood or reflector that is adapted to receive and support, fixedly or removably, air compressing means, preferably a vibrator type pump of the type commonly in use, and controllable heating means, by means of suitable platforms and supports with the necessary electrical connectors and switches therefor. In other words, a convenient unit into which the user can easily place desired or necessary standard aquarium accessories and easily remove the same when desired.

Another object of this invention is to provide a suitable location for the aquarium pump and its controls which are preferably situated above the level of the water in said aquarium to prevent siphoning action which sometimes occurs from damaging said pump.

It is still another object of the present invention to provide an aquarium hood or reflector of the above type which is easily constructed, and economical in operation.

It is a further object of the present invention to provide a cover for the exposed top portion of an aquarium to prevent undue evaporation of the water therein and to prevent the fish from jumping out, and the hinged mounting of said cover providing easy access for feeding and cleaning.

It is still a further object of the present invention to provide a suitable location for storing such accessory equipment as fish nets and food containers.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 8 is a perspective view, similar to Fig. 2 and showing the first form of the invention, but with the hingeably mounted cover removed.

Fig. 9 is a perspective view of a modified design.

Fig. 10 is a perspective view of a still further modified form of the invention.

Fig. 11 is a view similar to Fig. 8 but showing a still further modified form of the invention.

Figure 1:
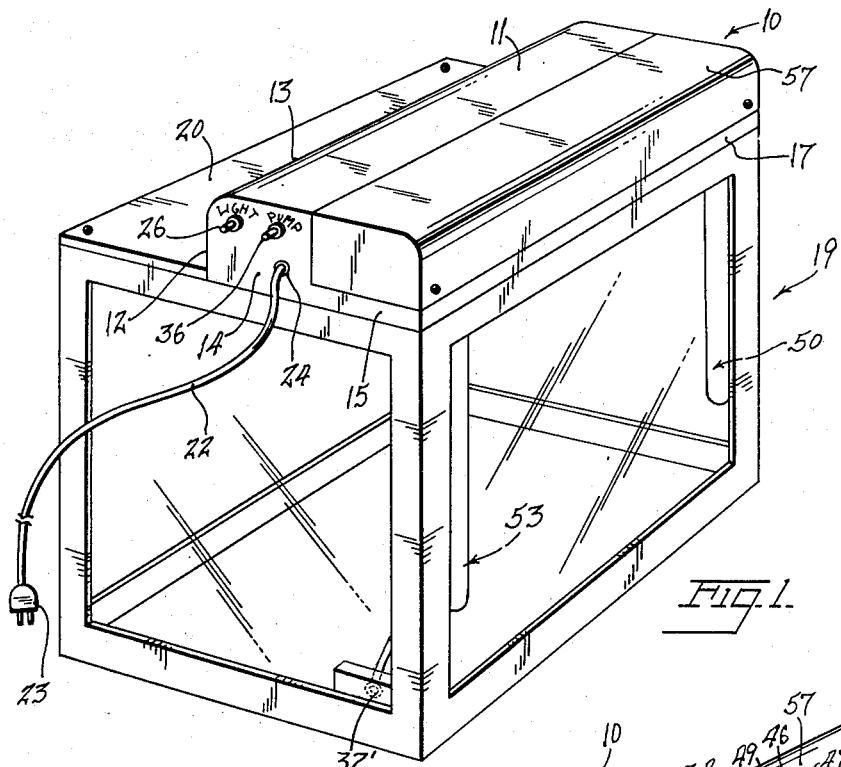
Fig. 1 is a perspective view of an aquarium hood embodying the features of the present invention shown in operative use upon an aquarium.

Referring now more in detail to the drawings, and more particularly to Figs. 1–5 and 8, 10 represents an aquarium hood or reflector having a top wall 11 connected to a rear wall 12 by means of a curved portion 13 and including the end wall 14. The end walls 14 at their lower front portions are integrally formed with extensions 15 connected by horizontal bottom wall 16 and a vertical front wall 17, the front edge of the top wall 11 being connected to the rear edge of the bottom wall 16 by a vertical wall 18.

The hood 10 is adapted to rest on the top of the aquarium 19 (Fig. 1) across the top portion thereof, the remaining top portion of the aquarium being covered by a cover 20 hingeably connected in suitable manner to the bottom of the rear wall 12.

A pair of electric lamps 21 (Fig. 5) are suitably mounted below the top wall 11, the lamps 21 being connected in parallel with a suitable source of power by means of the wires 22 and a male plug 23, the wires 22 passing outwardly of the hood through an opening 24 provided in one end wall 14 thereof. A switch 25 (Fig. 5) is connected in series combination with the lamps 21 and includes an externally operable knob 26 extending outwardly through the end wall 14.

Figure 4:
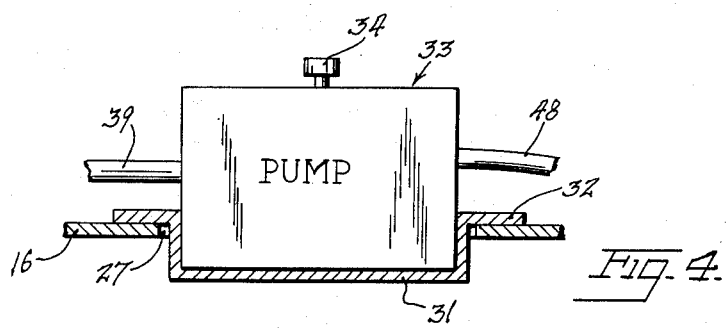
Fig. 4 is an enlarged vertical sectional view taken along the line 4—4 of Fig. 2.

The bottom wall 16 is provided with a central rectangular opening 27 and at each end with the circular openings 28 and 29, an elongated slot 30 parallel to the front wall 17 being provided in the bottom wall 16 intermediate the openings 27 and 28 (Fig. 8). A rectangular dish 31 (Fig. 3) of plastic or other suitable material fits downwardly within the opening 27 and is supported by means of a flange 32 formed along its upper edge, the dish 31 supporting therewithin an air compressor pump 33 having a speed-controlling knob 34 (Fig. 4). The pump 33 is connected in parallel with the lamps 21, a switch 35 (Fig. 5) being connected in series combination with the pump 33. The switch 35 is mounted on the inside of end wall 14 alongside switch 25 and includes an outwardly extending button 36 operable from outside of the hood.

Pump 33 is of the air compressor type and the output of the pump connects with a three-way valve 37 mounted on the bottom wall 16 alongside slot 30, the valve including a manually operable knob 38. The valve 37 and pump 33 are connected by the air line 39.

A two-way valve 40 is mounted in the bottom wall 16 alongside the valve 37 and includes a manually operable knob 41. The valves 40 and 37 are connected by air line 42. The output of valve 40 is connected to a filter unit, not shown, by means of an air line 43.

The valve 37 is connected to a conventional air stone shown in the patent to Maris No. 2,008,363 and indicated diagrammatically at 37' by means of an air line 44, the stone being disposed at the bottom of the aquarium. It will be noted that the air lines 43, 44 pass downwardly through the slot 30 provided therefor.

Figure 5:
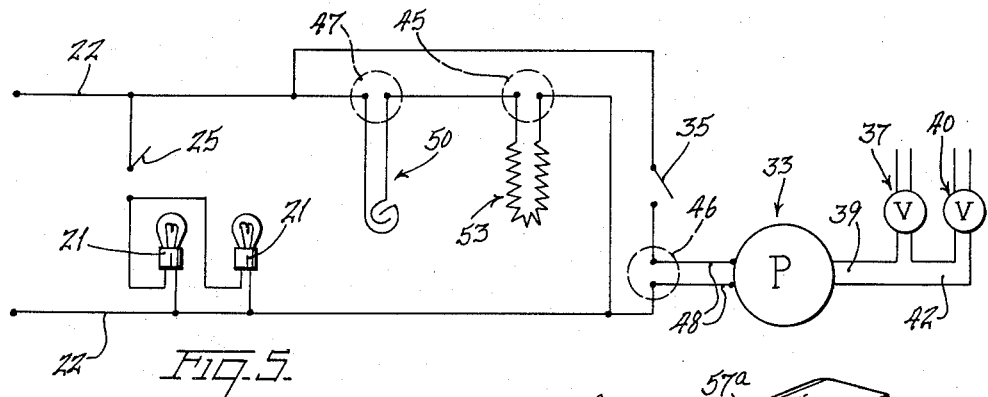
Fig. 5 is a circuit diagram illustrating the manner in which the various units are connected electrically.

A pair of female outlets 45 and 47 are mounted at opposite ends of the vertical wall 18 (Fig. 8), the outlets 45, 47 being connected in series with each other, both connected in parallel with the lamps 21 (Fig. 5). A third female outlet 46 is mounted in the vertical wall 18 alongside outlet 47 and is connected in parallel with the female outlets 45, 47 and lamps 21. The pump 33 is connected (Fig. 2) to the female outlet 46 by means of the wires 48 and male plug 49.

Figure 2:
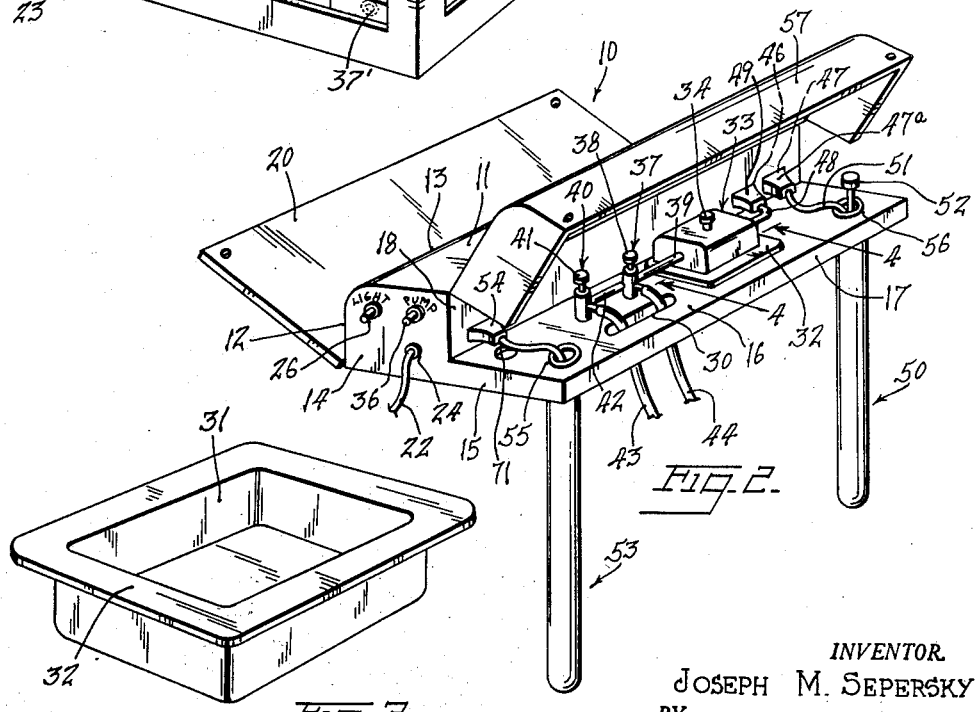
Fig. 2 is a perspective view of the hood, shown alone, with the cover portion thereof in a raised position.
Figure 3:
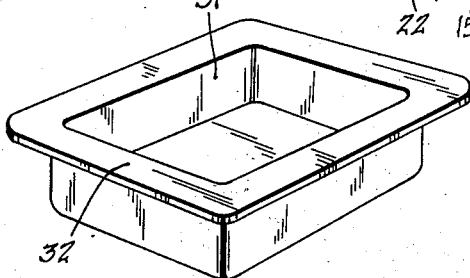
Fig. 3 is a perspective view of the plastic insert, shown alone, for supporting the pump.

A removable thermostat 50 of a well known construction is provided with a male plug 47ª and wires 51, the male plug being received within the female plug 47 (Fig. 5). The thermostat 50 includes a control knob 52 (Fig. 2).

A removable heater 53 of a well known construction is provided with a male plug 54 adapted to be plugged into the female plug 45, the upper edge of the heater 53 being provided with a flange 55 for supporting the same within the opening 28. The thermostat 50 is also provided with a flange 56 at its upper end for supporting the same within the opening 29 in a removable manner.

The insert 31 may be as deep as necessary to accommodate the pump 33 and may even descend into the water if necessary.

The thermostat 50 and heater 53 may be combined into a single unit, if desired.

Further, while I have shown heating and thermostat means suspended by the flanges 55 and 56, it is to be understood that the heater and thermostat may be of the submergible type designed to lie on the bottom of the aquarium at the ends of their respective line cords, which, it will be noted, are removably connected to the hood unit.

It is to be further understood that while I have shown the thermostat having its activating parts submerged, a capillary tube and bellows type of thermostat may also be employed with the control knob therefor being placed in an accessible position within the hood, only the capillary tube being suspended into the aquarium.

A cover 57 is hingeably connected along its rear edge to the top of the vertical wall 18 and serves to normally enclose the accessories, as shown in Fig. 1.

Figure 6:
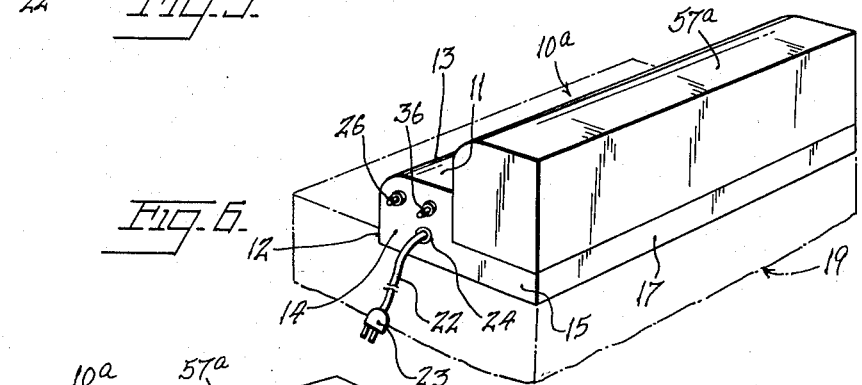
Fig. 6 is a rear perspective view of a modified form of the present invention.
Figure 7:
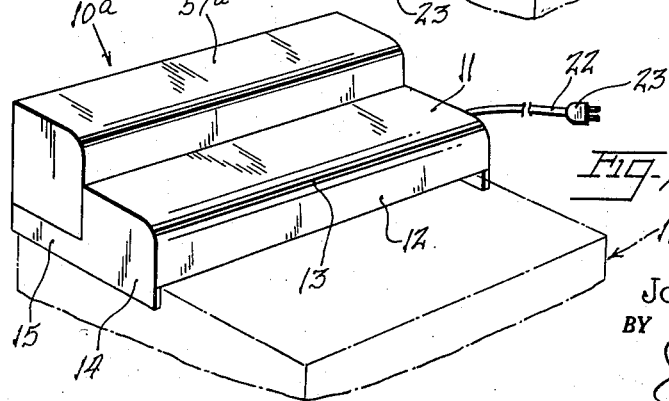
Fig. 7 is a front perspective view thereof.

Referring now in particular to Figs. 6 and 7, there is shown a modified form of the present invention, and including a raised cover 57ª hingeably connected to the hood and designed to accommodate a pump of greater height.

In other respects the form of the invention shown in Figs. 6 and 7 is the same as that shown in Figs. 1 through 5 and like reference numerals identify corresponding parts throughout the several views.

Referring now particularly to Fig. 9, there is shown a still further modified form of the invention, referred to collectively as 10ᵇ, wherein the opening 27 and insert 31 of the first form are eliminated. In this case, the top wall 11ᵇ and the vertical wall 18ᵇ are integrally formed with a recessed compartment 70 adapted to contain the pump. Slots 30ᵇ are now provided in the bottom wall 16ᵇ on each side of the recess 70.

In other respects the form of the invention shown in Fig. 9 is the same as that shown in Figs. 1 through 5, and like reference numerals identify like parts throughout the several views.

It will be noted that the bottom wall 16 of the first form is also provided with an opening 71 from which depends in suitable manner a thermometer, not shown. Rubber padding, not shown, will also be provided intermediate the pump 33 and insert 31 for damping the vibrations of the pump. The hoods may also be provided with louvres, not shown, for cooling purposes.

Referring now particularly to Fig. 10, there is shown a still further modified form of the invention, referred to collectively as 10ᶜ, wherein the end walls 14 are provided with short extensions 15ᶜ, providing a relatively narrow bottom wall 16ᶜ. An L-shaped bracket 72 is secured to the vertical wall 17 by means of bolts 73 and includes a retaining flange 74 for supporting the pump in an overhanging manner. In other respects the form of the invention shown in Fig. 10 is the same as that shown in Figs. 1 through 5, and like reference numerals identify like parts throughout the several views.

Referring now particularly to Fig. 11, there is shown a still further modified form of the present invention, referred to collectively as 10ᵈ and including a bottom wall 16ᵈ provided with a pair of openings 27ᵈ on each side of the valves 37 and 40, a slot 30ᵈ being provided in wall 16ᵈ alongside the valves. A pair of inserts similar to insert 31 will be positioned within each of the openings 27ᵈ and serve to support the pump 33 and filtering equipment not shown. The bottom wall 16ᵈ may, of course, be provided without the openings 27ᵈ, in which case the pump and filtering equipment will rest directly thereon.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In an aquarium, a hood at the top of the aquarium, electric light means disposed entirely within said hood, electrical heating means extending downwardly from said hood, thermostatic means extending downwardly from said hood, air compressing means disposed entirely within said hood, said electrical heating and thermostatic means being positioned so as to be concealed within the corners of the aquarium, and a movable cover providing access to said air compressing means, said air compressing means comprising the bottom wall of said hood below said cover having a rectangular opening, a removable insert supported within said opening, said compressing means comprising a pump mounted within said insert, a three-way valve within said hood including a manually operable knob, said three-way valve being connected to said compressor pump, a two-way valve within said hood and including a manually operable knob, said two-way valve being connected to said three-way valve for controlling the passage of the air.

2. In an aquarium, a hood at the top of the aquarium, electric light means disposed entirely within said hood, electrical heating means extending downwardly from said hood, thermostatic means extending downwardly from said hood, air compressing means disposed entirely within said hood, said electrical heating and thermostatic means being positioned so as to be concealed within the corners of the aquarium, a movable cover providing access to said air compressing means, a plurality of female outlets connected in parallel with said electric light means, said air compressing, heating and thermostatic means being removably connected to said female outlets.

3. In an aquarium, a hood at the top of the aquarium, electric light means disposed entirely within said hood, electrical heating means extending downwardly from said hood, thermostatic means extending downwardly from said hood, air compressing means disposed entirely within said hood, said electrical heating and thermostatic means being positioned so as to be concealed within the corners of the aquarium, an overhanging bracket secured to said hood, and an air compressor pump mounted on said bracket.

4. In an aquarium, a hood at the top of the aquarium, electric light means disposed entirely within said hood, electrical heating means extending downwardly from said hood, thermostatic means extending downwardly from said hood, air compressing means disposed entirely within said hood, said electrical heating and thermostatic means being positioned so as to be concealed within the corners of the aquarium, and a movable cover providing access to said air compressing means, the bottom wall of said hood below said cover having a pair of rectangular openings therethrough, removable inserts supported within said openings, and air compressing means on one of said inserts, the other insert being capable of supporting filtering means.

5. A hood for aquarium comprising a hollow compartment extending the length of the aquarium and provided at one side with an extension, and a hingeably mounted cover overlying said extension, said extension having an opening therein adapted to receive a pump-supporting insert, said extension having secondary openings adapted to support in vertical positions a heating element and thermostat, said hollow portion having openings therein adapted to mount female outlets and switches.

6. In an aquarium, a platform at the top of the aquarium, said platform including a raised portion, end walls for said raised portion, electric light means disposed beneath said raised portion, a vertical wall descending from said raised portion to the relatively lower portion of said platform, said vertical wall having a pair of female electrical outlets mounted in series relation to each other, said pair being mounted in parallel with said light means, a third female outlet mounted in parallel with said light means, a series mounted switch to control said light means, a series mounted switch to control said third female outlet, a plurality of openings in said lower platform adapted to receive and support vertically disposed heating and thermostat means within the corners of said aquarium, an opening in said lower platform adapted to receive and support a flanged receptacle, and a unitary source of power for said light means and female outlets.

References Cited in the file of this patent

UNITED STATES PATENTS

| | | |
|---|---|---|
| 1,640,292 | Petrick | Aug. 23, 1927 |
| 2,002,380 | Wernicke et al. | May 21, 1935 |
| 2,008,363 | Maris | July 16, 1935 |
| 2,566,990 | Mahle | Sept. 4, 1951 |
| 2,665,250 | Willinger et al. | Jan. 5, 1954 |
| 2,666,838 | Krah et al. | Jan. 19, 1954 |

FOREIGN PATENTS

| | | |
|---|---|---|
| 660,048 | Great Britain | Oct. 31, 1951 |
| 853,981 | Germany | Oct. 30, 1952 |